United States Patent [19]

Smith

[11] Patent Number: 5,713,225

[45] Date of Patent: Feb. 3, 1998

[54] APPARATUS AND METHOD FOR OPENING A PADLOCK

[76] Inventor: Floyd Bert Smith, 301 Lopes Rd., Suisun, Calif. 94585

[21] Appl. No.: 823,615

[22] Filed: Mar. 25, 1997

[51] Int. Cl.[6] .................... B23B 35/00; E05B 63/00
[52] U.S. Cl. ................... 70/51; 70/465; 408/1 R; 408/97; 408/241 B
[58] Field of Search .................. 70/40, 51, 372, 70/417, 431, 465, 466, 394; 408/1 R, 72 B, 97, 115 B, 115 R, 241 B

[56] References Cited

U.S. PATENT DOCUMENTS

| | | | |
|---|---|---|---|
| 1,412,087 | 4/1922 | Ottinger | 408/115 R |
| 4,261,093 | 4/1981 | Steffen et al. | 408/1 R X |
| 4,307,983 | 12/1981 | Blough et al. | 408/72 B |
| 4,714,386 | 12/1987 | Phillips | 408/72 R |
| 4,865,493 | 9/1989 | Miller | 408/1 R |
| 5,454,245 | 10/1995 | Markisello | 70/252 |
| 5,479,802 | 1/1996 | Miller | 70/443 |

*Primary Examiner*—Lloyd A. Gall
*Attorney, Agent, or Firm*—Thomas R. Lampe

[57] ABSTRACT

A padlock holder is provided for receiving the body of a padlock and maintaining the padlock body at a predetermined location within the holder. When the padlock body is at that location the tumbler mechanism of the padlock is in registry with a hole formed in the holder. A drill bit is positioned in the opening to drill through the padlock body and the tumbler mechanism so that the padlock can be opened.

16 Claims, 3 Drawing Sheets

APPARATUS AND METHOD FOR OPENING A PADLOCK

TECHNICAL FIELD

This invention relates to apparatus for opening a padlock. More particularly, the apparatus is for the purpose of opening a padlock in the absence of the padlock key. The invention also encompasses a method for opening a padlock without employing the padlock key. The apparatus and method of the present invention are useful, for example, when the key or keys initially provided with the padlock have been lost or misplaced.

BACKGROUND OF THE INVENTION

Loss of padlock keys is a relatively common occurrence and such loss can present considerable difficulties when the padlock is secured in place to lock structures such as storage containers and storage facilities. One can, of course, retain the services of a locksmith to open such locks; however, this can be quite expensive. Then too, one has the option of employing tools such as high speed grinders to grind through the lock to destroy the lock mechanism so that the padlock shackle can be opened. Grinders and similar types of tools are relatively unsafe and not only can damage property but also cause harm to the individual employing them in an attempt to open a padlock. It is very difficult to drill through a padlock body to the tumbler mechanism since the location of such mechanism must be guessed and it is difficult to keep a rotational drill bit properly oriented. Bolt cutters have also been employed; however, certain types of padlock configurations are such that a bolt cutter cannot be properly positioned relative to the shackle of the padlock to sever it.

DISCLOSURE OF INVENTION

The present invention relates to apparatus for opening a padlock without the padlock key thereof through use of a conventional electric drill. The drill bit is properly and automatically positioned relative to the padlock so that the drill engages the internal tumbler mechanism of the padlock and destroys or deactivates such mechanism so that the padlock shackle can be readily opened. Opening of the padlock is accomplished very quickly and safely. The apparatus of the invention is further characterized by its relative simplicity and low expense.

The present invention is for opening a padlock including a padlock body defining a padlock body interior, a shackle connected to the padlock body, and a rotor defining a keyway rotatably mounted relative to the padlock body, extending into the padlock body interior and operatively associated with a tumbler mechanism within the padlock body interior.

The apparatus includes a holder defining a holder interior for holding the padlock body of a padlock and further defining a holder opening communicating with the holder interior for accommodating a drill bit and allowing entrance of the drill bit into the holder interior.

The apparatus additionally includes padlock positioning means for positioning the padlock at a predetermined location within the holder interior with the tumbler mechanism of the padlock in registry with the holder opening.

The holder includes a bushing having an inner bushing wall defining the holder opening, such bushing being used to guide a drill bit entering the holder interior through the holder opening and for maintaining the drill bit substantially coaxial with the holder opening.

The present invention also encompasses a method for opening a padlock.

Other features, advantages, and objects of the present invention will become apparent with reference to the following description and accompanying drawings.

BEST MODE FOR CARRYING OUT THE INVENTION

Figure 1:
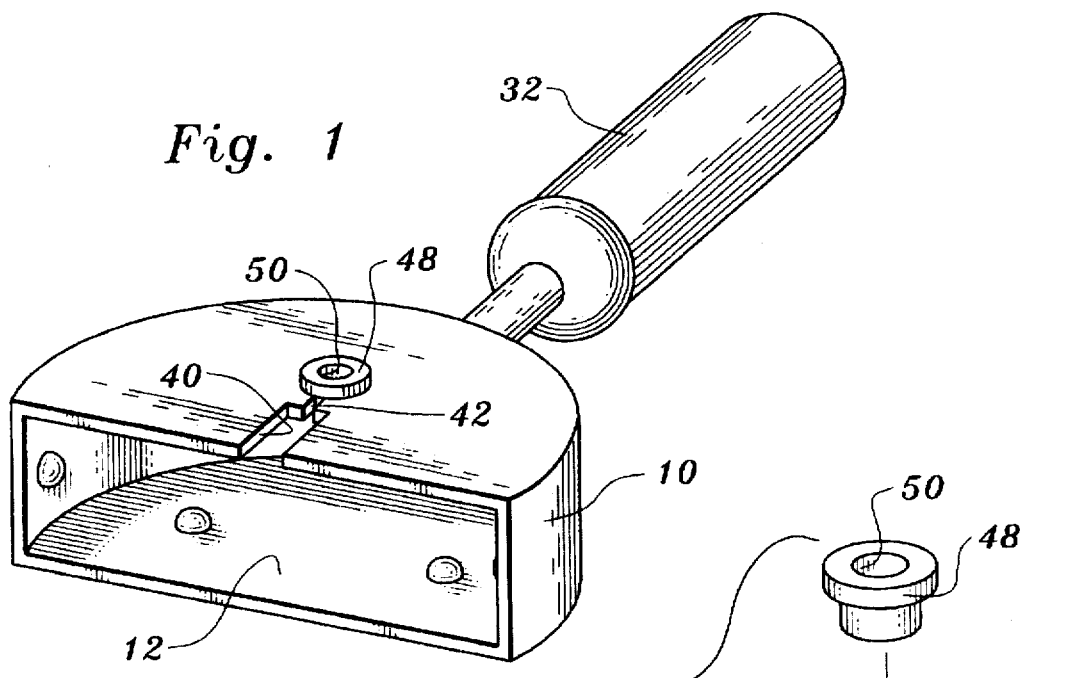
FIG. 1 is a perspective view of a holder for a padlock constructed in accordance with the teachings of the present invention.

Referring now to the drawings, apparatus constructed in accordance with the teachings of the present invention includes a holder or housing 10 formed of metal or other suitable material defining a holder interior 12. The holder is open at one end and the holder interior is in the nature of a socket for receiving the padlock body 14 of a padlock 16. The particular form of padlock illustrated is of conventional construction and includes a shackle 18 connected to the padlock body. A rotor 20 defining a keyway is rotatably mounted relative to the padlock body and extends into the padlock body interior. The rotor is operatively associated with a tumbler mechanism of conventional construction within the padlock body interior, such tumbler mechanism being designated by reference numeral 22 and illustrated by dash lines in FIGS. 3 and 9.

Figure 3:
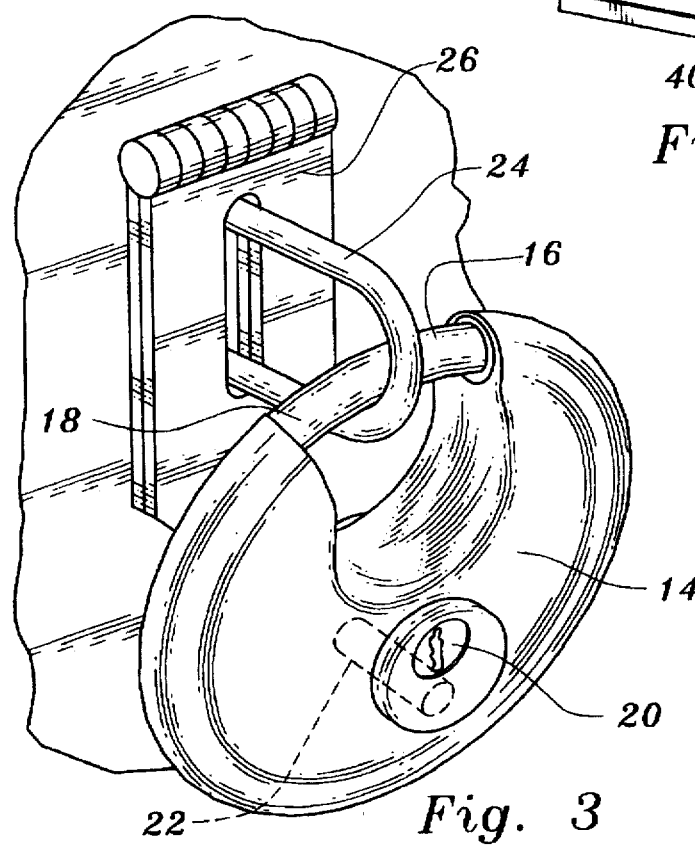
FIG. 3 is a perspective view of a locked padlock locking closure elements in place, the tumbler mechanism employed in the padlock being shown by dash lines.
Figure 4:
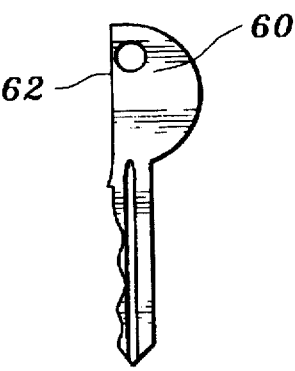
FIG. 4 is an elevation view of a key employed in the apparatus.
Figure 5:
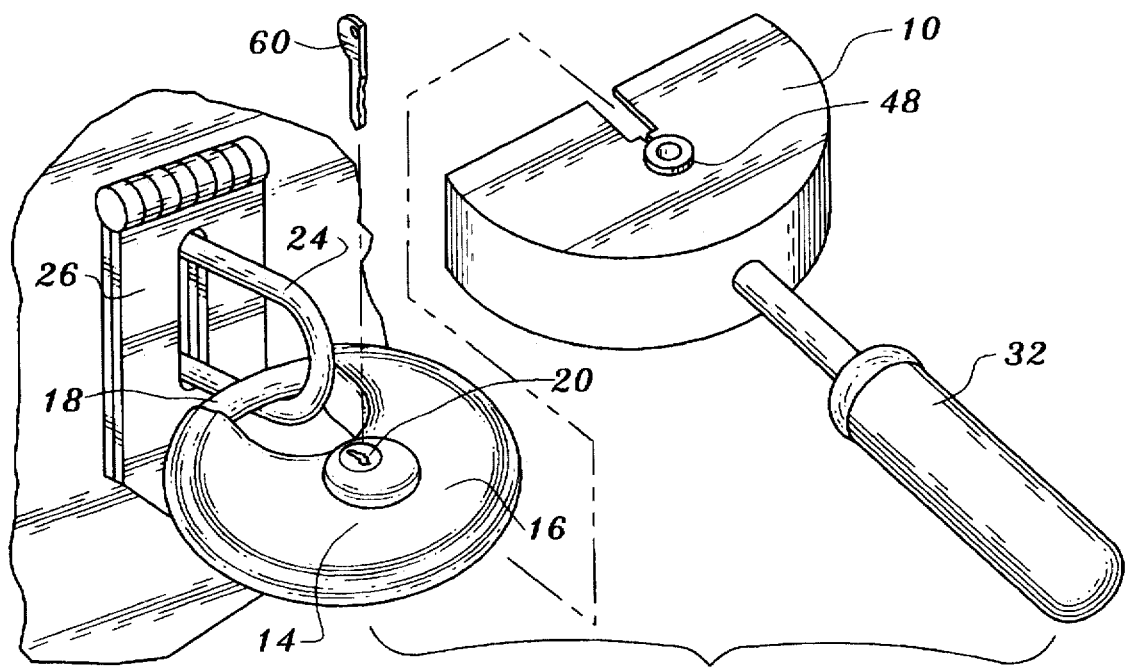
FIG. 5 is a perspective, exploded view illustrating the holder and key prior to their association with the padlock.
Figure 6:
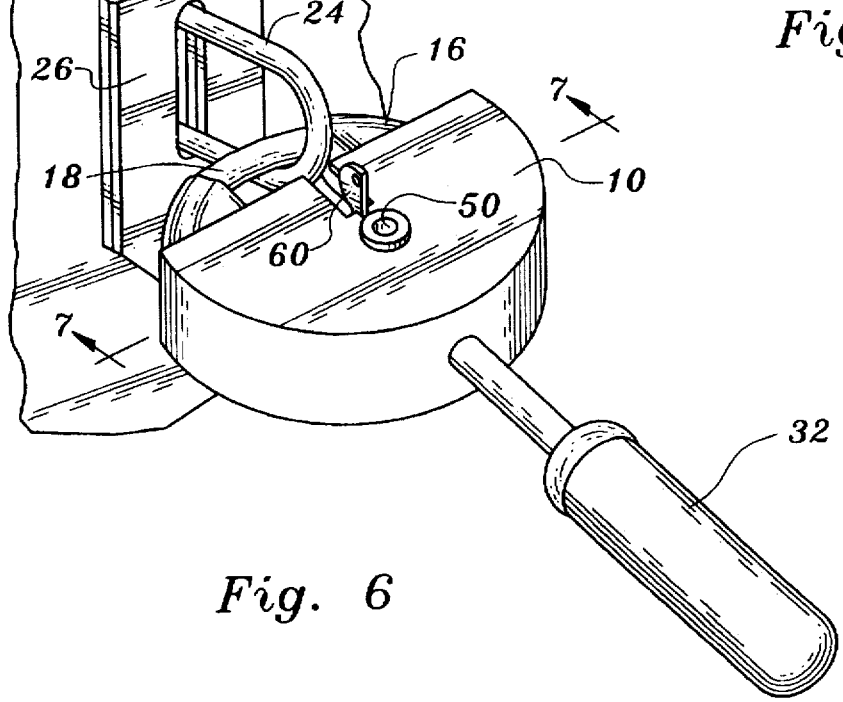
FIG. 6 illustrates the padlock body disposed within the interior of the holder with the key protecting from the keyway of the padlock positioned in an indentation formed in the holder.

In FIGS. 3, 5 and 6, padlock 16 is shown with the shackle 18 thereof in closed or locked condition and positioned in the staple 24 of a closure also including a hinged hasp element 26. When the padlock key is lost the limited length of the shackle makes it extremely difficult to cut it to remove the padlock and such attempts can be dangerous as well as cause harm to the structure to which the padlock is secured. The same holds true when attempting to grind the padlock with a grinder. While retaining the services of a locksmith to pick the lock is an option, lock picking is time consuming and expensive, some padlocks requiring up to 4 hours or more to open the lock by picking it. It is usually not feasible or practical to drill a padlock in an attempt to destroy the internal lock mechanism since the drill bit is likely not to be properly placed with respect to such mechanism. An individual is not likely to know precisely where to drill. Also, it is difficult to keep the drill bit on track during the drilling operation.

The apparatus of the present invention precisely places a drill bit with respect to the tumbler mechanism of a padlock so that opening of the lock as a result of drilling can take place in a matter of minutes.

Figure 7:
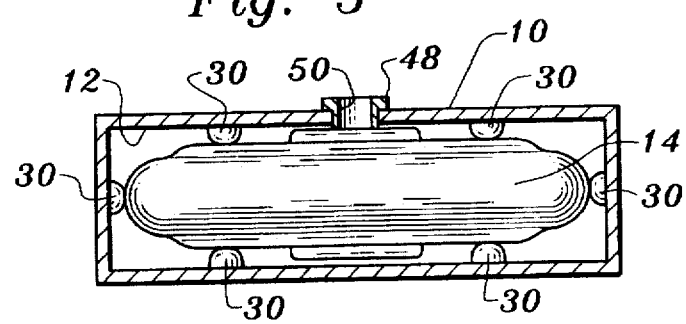
FIG. 7 is a cross-sectional view taken along the line 7—7 of FIG. 6.
Figure 8:
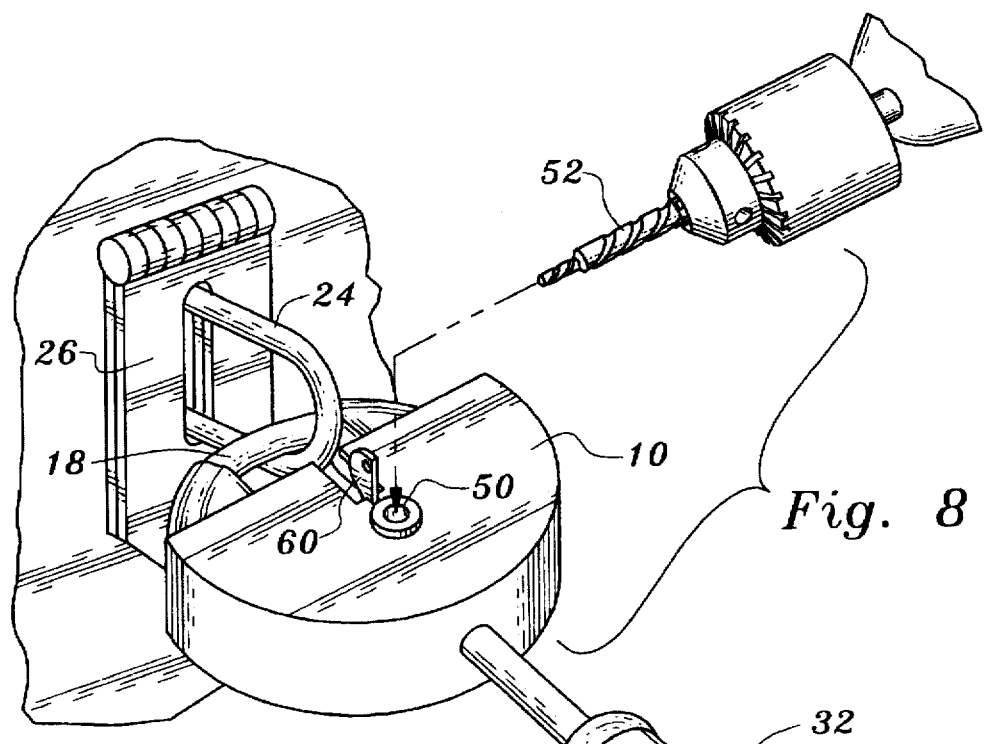
FIG. 8 is a view similar to that of FIG. 6, but illustrating placement of the drill bit of a drill into the bushing opening.

The illustrated padlock 16 has a rounded outer periphery and the holder or housing 10 has an interior defined by holder walls of generally the same configuration, but somewhat larger. Detents 30 (see FIG. 7) project into the holder interior from the holder, the detents being spaced from one another to engage the padlock at different locations on the padlock body when the padlock body is received within the holder interior as shown in FIGS. 6–8. A handle 32 projects from the holder 10 to facilitate its use by an individual.

When the padlock body is positioned or seated within the holder interior, a pair of the detents 30 engage the outer peripheral wall of the padlock body just above the locations thereon where the padlock body turns inwardly toward the shackle at the upper or shackle end of the padlock. Other opposed detents 30 engage the side walls of the padlock body, as may best be seen with reference to FIG. 7. This arrangement assists in the positioning of the padlock at a predetermined location within the holder interior.

Figure 2:
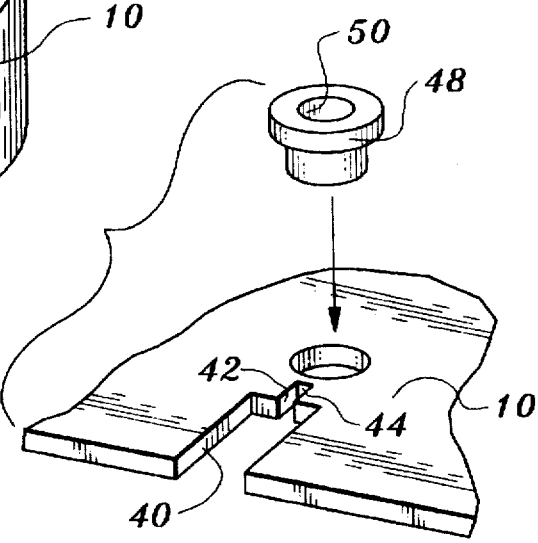
FIG. 2 is an enlarged detailed, exploded view illustrating a portion of the holder and showing the bushing thereof being mounted in position on the rest of the holder.

At the open end thereof, holder 10 defines an indentation 40 formed in one of the side walls of the holder. The indentation 40 includes a notch 42 defined by a pair of straight notch defining walls terminating at an abutment surface 44 (see FIG. 2).

The holder side wall defining indentation 40 also defines a holder opening communicating with the holder interior for accommodating a drill bit and allowing entrance of the drill bit into the holder interior.

More particularly, the holder opening is defined by a bushing 48 attached to the holder side wall at a location adjacent to the indentation 40. The holder opening is designated by reference numeral 50 and communicates with the housing interior.

The inner bushing wall defining the holder opening is cylindrical and engageable by a drill bit entering the holder interior through the holder opening for maintaining the drill bit substantially coaxial with the holder opening.

FIG. 8 illustrates a drill bit 52 being positioned for entry into the holder opening 50, the illustrated drill bit being a double margin drill. The diameter of the holder opening should be slightly greater than the size of the maximum drill bit diameter. For example, if the holder opening has a diameter of 0.25 inches, the drill bit maximum diameter should be slightly less, for example, 0.2495 inches.

The purpose of the drill bit is to destroy or damage the tumbler mechanism 22 of the padlock sufficiently so that it is deactivated and opening of the shackle can be readily accomplished. Thus, it is highly important to properly place the padlock relative to the holder.

In the preferred arrangement of this invention, this is accomplished by employing a key 60 which is strictly for the purpose of ensuring proper placement of the padlock in the holder with the holder opening 50 in registry with the tumbler mechanism of the padlock. That is, the key 60 is not a master key in the ordinary or conventional sense since its use will not allow opening of the padlock merely by inserting the key in the keyway and turning the rotor.

Prior to insertion of the padlock body into the holder interior, the key 60 is inserted into the keyway so that the key projects outwardly from the padlock body. The key 60 is automatically oriented so that it is in alignment with notch 42. Next, the padlock and the holder are moved relative to one another until the key enters notch 42 and abuts against abutment surface 44 formed in the holder side wall. The key 60 includes a key abutment surface 62 which is substantially flat. When the key abutment surface 62 engages the holder abutment surface 44 and the padlock body is engaged by the detents as shown in FIG. 7, the padlock is properly positioned within the holder interior. The distance between the notch defining walls is slightly greater than the width of the key where the key is positioned in the notch to ensure ready entry of the key into the notch.

Figure 9:
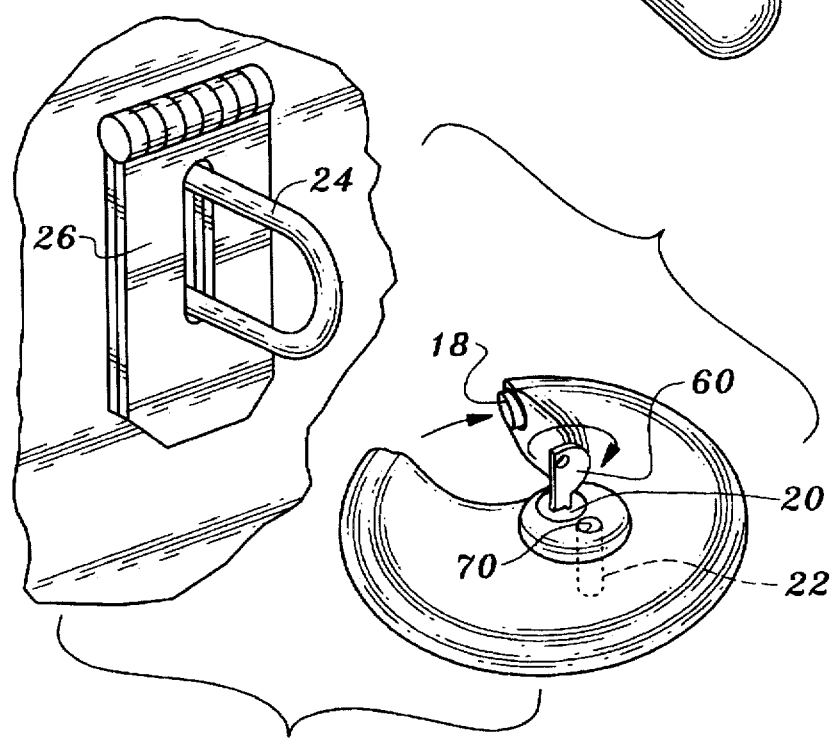
FIG. 9 is a perspective view illustrating the padlock having been removed from locking engagement with the closure structure after the tumbler mechanism of the padlock has been drilled.

When the padlock is positioned relative to the holder as shown in FIGS. 6 through 8, the opening 50 is in registry with the tumbler mechanism of the padlock. The drill bit is now placed in holder opening 50 and a hole is drilled through the padlock body and into the tumbler mechanism. The drill bit is then removed from the padlock and the holder and the holder itself removed from the padlock. The shackle 18 is then readily manually moved to its open position as shown in FIG. 9 by turning the key or by simply grasping the shackle and moving it to the open position. In FIG. 9 the drill hole caused by the drilling operation is designated by reference numeral 70. During the drilling operation the key 60 does not impede movement of or interfere with the drill since the manually graspable end of the key is enlarged in only one direction, i.e. the direction opposed to flat abutment surface 62.

I claim:

1. Apparatus for opening a padlock including a padlock body defining a padlock body interior, a shackle connected to said padlock body, and a rotor defining a keyway rotatably mounted relative to said padlock body, extending into said padlock body interior and operatively associated with a tumbler mechanism within said padlock body interior, said apparatus comprising, in combination:

a holder defining a holder interior for holding the padlock body of a padlock and further defining a holder opening communicating with said holder interior for accommodating a drill bit and allowing entrance of said drill bit into said holder interior; and padlock positioning means for positioning the padlock at a predetermined location within said holder interior with the tumbler mechanism of the padlock in registry with said holder opening.

2. The apparatus according to claim 1 wherein said holder includes a bushing having an inner bushing wall defining said holder opening.

3. The apparatus according to claim 2 wherein said inner bushing wall is cylindrical and engageable by a drill bit entering said holder interior through said holder opening for maintaining the drill bit substantially coaxial with said holder opening.

4. The apparatus according to claim 1 wherein said holder additionally defines an indentation spaced from said holder opening terminating at a holder abutment surface on said holder, said padlock positioning means including a guide member connected to and extending from the padlock positioned in said indentation and engaging said holder abutment surface when the padlock is within said holder interior.

5. The apparatus according to claim 4 wherein said guide member comprises a key extending into the keyway of the padlock.

6. The apparatus according to claim 5 wherein said key includes a key abutment surface for abutting the holder abutment surface.

7. The apparatus according to claim 6 wherein said key abutment surface is substantially straight.

8. The apparatus according to claim 5 wherein said indentation comprises a notch defined by notch defining walls spaced apart a distance slightly exceeding the width of said key at the location on said key where said key is positioned in said notch.

9. The apparatus according to claim 1 wherein said padlock positioning means includes at least one detent projecting from said holder into said holder interior for engaging the padlock body and restricting movement of the padlock in the holder interior.

10. The apparatus according to claim 9 wherein said padlock positioning means includes a plurality of detents spaced from one another and projecting from said holder into said holder interior for engaging the padlock body at different locations on the padlock body.

11. The apparatus according to claim 10 wherein at least one of said detents is positioned to engage a side wall of the padlock body.

12. The apparatus according to claim 10 wherein at least one of said detents is positioned to engage an outer peripheral wall of the padlock body.

13. The apparatus according to claim 1 wherein said holder comprises an open ended housing and wherein said holder interior comprises a socket for receiving the padlock body.

14. A method for opening a padlock including a padlock body defining a padlock body interior, a shackle connected to said padlock body, and a rotor defining a keyway rotatably mounted relative to said padlock body, extending into said padlock body interior and operatively associated with a tumbler mechanism within said padlock body interior, said method comprising the steps of:

placing a padlock at a predetermined location relative to a padlock holder having a drill bit guide opening formed therein, said padlock when at said predetermined location having the tumbler mechanism thereof in registry with said drill bit guide opening;

while maintaining said padlock at said predetermined location, passing a drill bit through said drill bit guide opening and into engagement with the padlock body of the padlock;

while maintaining said drill bit in engagement with the padlock body, rotating said drill bit to drill a hole in the padlock body in registry with the tumbler mechanism; and after drilling a hole in the padlock body, drilling into said tumbler mechanism with said drill bit to render said tumbler mechanism inoperable whereby said shackle may be manually moved relative to said padlock body to open the padlock.

15. The method according to claim 14 wherein the step of placing a padlock at a predetermined location relative to a padlock holder includes the steps of connecting a guide member to the padlock with the guide member projecting from the padlock and bringing the guide member into abutting engagement with the padlock holder.

16. The method according to claim 15 wherein the guide member is a key and wherein the step of connecting the guide member to the padlock comprises inserting the key into the keyway of the padlock.

* * * * *